United States Patent
Seo

(10) Patent No.: US 8,269,127 B2
(45) Date of Patent: Sep. 18, 2012

(54) TULIP CONTACTING DEVICE FOR VACUUM CIRCUIT BREAKER

(75) Inventor: Jae-Kwan Seo, Chungcheongbuk-Do (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 379 days.

(21) Appl. No.: 12/621,649

(22) Filed: Nov. 19, 2009

(65) Prior Publication Data

US 2010/0140225 A1    Jun. 10, 2010

(30) Foreign Application Priority Data

Dec. 4, 2008 (KR) .................. 10-2008-0122770

(51) Int. Cl.
*H01H 33/66* (2006.01)
(52) U.S. Cl. ..................... 218/123; 218/128
(58) Field of Classification Search ............ 218/10, 218/16–26, 123–128, 146; 335/15, 16, 147, 335/196
See application file for complete search history.

(56) References Cited

U.S. PATENT DOCUMENTS

| | | | | |
|---|---|---|---|---|
| 5,482,481 | A | * | 1/1996 | Takeuchi ............ 439/821 |
| 6,024,611 | A | * | 2/2000 | Giuseppe ............ 439/819 |
| 2009/0255905 | A1 | | 10/2009 | Lee |

FOREIGN PATENT DOCUMENTS

| | | |
|---|---|---|
| JP | 61-91818 | 6/1986 |
| JP | 2-078115 | 3/1990 |
| JP | 2-132714 | 5/1990 |
| JP | 8-222063 | 8/1996 |
| KR | 0398420 | 10/2005 |

\* cited by examiner

*Primary Examiner* — Amy Cohen Johnson
*Assistant Examiner* — Marina Fishman
(74) *Attorney, Agent, or Firm* — Greenblum & Bernstein P.L.C.

(57) ABSTRACT

Disclosed is a tulip contacting device for a vacuum circuit breaker employed to quickly break off an electric power system, in which contact fingers are bidirectionally rotatable in a state of being restricted at an outer diameter portion of a mover holder, such that the flexibility of the contact fingers can be increased, whereby it is possible, upon connecting the vacuum circuit breaker to a case, to flexibly deal with the variation of axial angles of terminals inserted in both sides of the tulip contacting device, and also springs may be coupled to the contact fingers, respectively, so as to effectively prevent separation and overall destroy of the contact fingers from the mover holder during installation.

9 Claims, 6 Drawing Sheets

TULIP CONTACTING DEVICE FOR VACUUM CIRCUIT BREAKER

CROSS-REFERENCE TO A RELATED APPLICATION

Pursuant to 35 U.S.C. §119(a), this application claims the benefit of earlier filing date and right of priority to Korean Application No. 10-2008-0122770, filed on Dec. 4, 2008, the contents of which is incorporated by reference herein in its entirety.

BACKGROUND OF THE INVENTION

1. Field of the Invention

The present invention relates to a tulip contacting device for a vacuum circuit breaker, and particularly, to a tulip contacting device for a vacuum circuit breaker capable of preventing damage of the tulip contacting device and a defective connection and reducing an increase in contact resistance due to vibration or deviation of terminals, by being configured such that a main circuit section terminal is slidably coupled to an under seat of the tulip contacting device.

2. Background of the Invention

In general, a vacuum circuit breaker is a device for protecting an electric power system, in which a vacuum interrupter is made of an arc extinguishing material so as to deliberately perform power transmission/reception, switching, termination and the like and fast perform an automatic blocking of the electric power system when any breakdown occurs.

The vacuum circuit breaker serves to quickly separate (break off, block) a circuit by an arc extinguishing operation by which an arc product generated upon opening and closing a normal load and cutting off a fault current is rapidly dispersed within a vacuum container, thus to protect circuit and other equipment.

Such vacuum circuit breaker is provided with a main circuit section, a truck mechanism (moving carriage), a cradle and an auxiliary element. The truck mechanism is integrally coupled to the main circuit section, and provided with a mechanical part which selectively moves the main circuit section to the cradle.

The coupling or separation between the main circuit section and the cradle is allowed by a tulip contactor of the main circuit section and a cradle terminal of the cradle. During operation in a state of the main circuit section being coupled to the cradle, a current is introduced into a vacuum interrupter installed inside the main circuit section via an upper terminal, and the introduced current is discharged via a lower terminal. During the operation, if any accident occurs, the vacuum interrupter instantaneously cuts off the current.

Here, the tulip contactor includes contact fingers disposed in a circumferential direction to come in contact with circumferential surfaces of a main circuit terminal and a cradle terminal, a circular spring elastically surrounding an outer circumferential surface of the contact fingers, a star plate having a groove at its outer circumferential surface in the circumferential direction such that the contact fingers can be disposed in form of circle, and circular plates disposed at both sides of the star plate to support the contact fingers.

Here, the star plate may serve to fix the contact fingers in the circumferential direction for arrangement and also be fixed to the main circuit terminal by a screw so as to fit the contact fingers to the main circuit terminal.

In the tulip contactor having such configuration, since the circular plates are disposed at both sides of the star plate, the contact fingers are supported at both sides of the star plate in a radial direction, and the star plate is fixed to an outer diameter portion of the main circuit terminal by the screw, the flexibility is degraded after the main circuit terminal is coupled to the cradle terminal.

Also, since the star plate is restricted by the main circuit terminal from being moved in an axial direction, if a perpendicular deviation of the main circuit terminal and the cradle terminal occurs, a defective retraction of the cradle terminal may be caused, thereby interfering with a normal operation of the circuit breaker.

Further, a tension coil spring wound over the contact fingers allows the contact fingers to have contact pressure and simultaneously prevent the contact fingers from being separated from the star plate. Accordingly, upon a disconnection of wire, the arrangement of the contact fingers may become defective.

SUMMARY OF THE INVENTION

Therefore, to solve the problems of the related art, an object of the present invention is to provide a tulip contacting device for a vacuum circuit breaker capable of increasing flexibility of the tulip contacting device so as to flexibly deal with a variation of axial angle of terminals inserted in the tulip contacting device when assembling the vacuum circuit breaker to a case, and to prevent the separation and overall destroy of contact fingers from a star plate during installation.

To achieve these and other advantages and in accordance with the purpose of the present invention, as embodied and broadly described herein, there is provided a tulip contacting device for a vacuum circuit breaker including: a plurality of contact fingers disposed in a circumferential direction so as to allow an insertion of terminals; a mover holder having through holes formed in a circumferential direction, each contact finger being inserted and restricted in the corresponding through hole; and movable springs coupled onto the contact fingers in the through holes of the mover holder and configured to provide an elastic force to the contact fingers.

Here, semicircular protrusions contactable with outer surfaces of the terminals may be formed at both end portions of each contact finger, and a separation groove may be formed at each semicircular protrusion.

A coupling recess engaged with the mover holder may be formed at each contact finger.

The mover holder may be provided with a circular plate inserted in the contact fingers so as to restrict a lateral movement of the contact fingers.

Each of the contact fingers is provided with a connection portion along which the movable spring is inserted. Here, the movable spring may be a rod curved into a rectangular shape.

Each of the through holes of the mover holder may be provided with a narrow rectangular portion in which the contact finger is disposed, and a wide rectangular portion in which the movable spring is disposed.

A supporting plate for supporting a terminal may be connected to the mover holder, the supporting plate may have an insertion body inserted in the mover holder, and the insertion body may be provided with an annular tilt surface supported at the mover holder. Further, the insertion body may be provided with a coupling path through which a screw is coupled.

The supporting plate may further be provided with coupling openings for allowing the coupling to the terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of a tulip contacting device for a vacuum circuit breaker according to the preferred embodiment of the present invention, with reference to the accompanying drawings.

Figure 1:
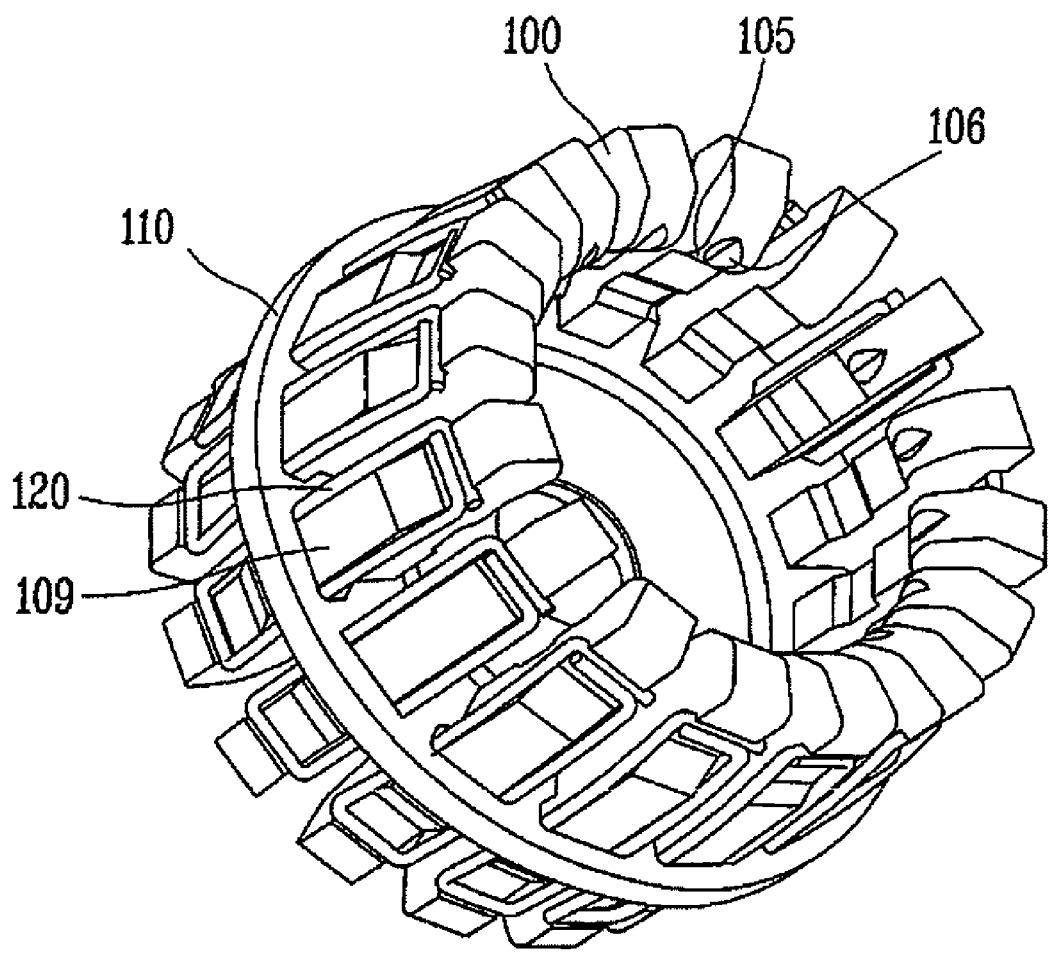
FIG. 1 is a perspective view of a tulip contacting device for a vacuum circuit breaker in accordance with one embodiment of the present invention.
Figure 2:
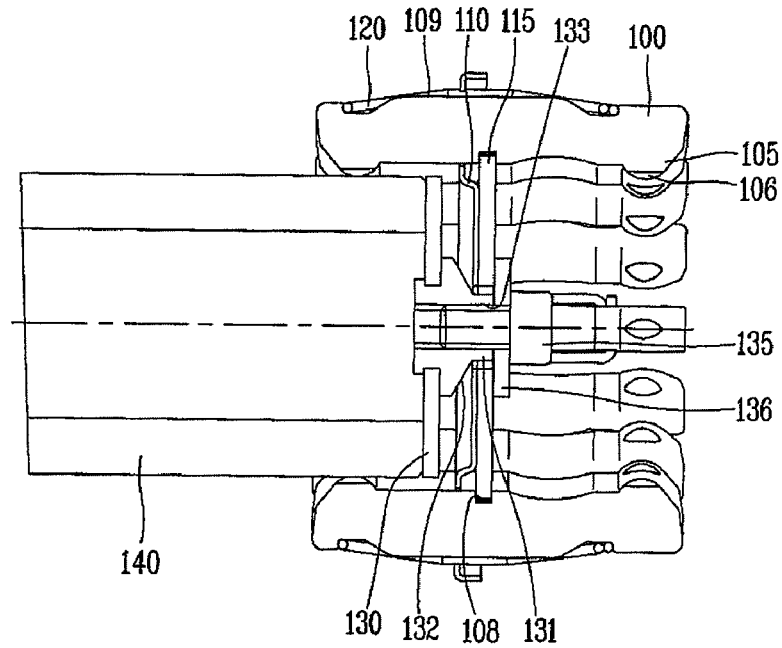
FIG. 2 is a longitudinal sectional view that a terminal is coupled to the tulip contacting device of FIG. 1.

As shown in FIGS. 1 and 2, a tulip contacting device for a vacuum circuit breaker according to one embodiment of the present invention may include contact fingers 100, a mover holder 110, a circular plate 115, a movable spring 120 and a supporting plate 130.

Here, the contact fingers 100 may be arranged at the mover holder 110 in a circumferential direction so as to form a space in which terminals are inserted. Both end portions of each contact finger 100 are positioned at both sides of the mover holder 110, so as to be connected to terminals inserted in both sides thereof.

Figure 3:
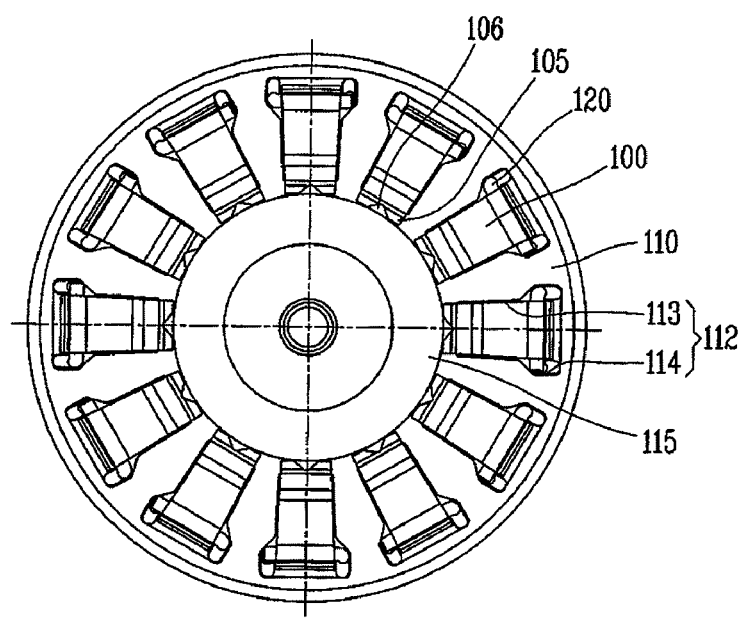
FIG. 3 is a right side view of FIG. 1.

As shown in FIG. 3, the mover holder 110 may be provided with through holes 112 formed in a circumferential direction, and accordingly the contact fingers 100 are inserted in the corresponding through holes 112 to be locked (restricted). The through hole 112 is a space in which the contact finger 100 is inserted, and thus it is configured to correspond to the shape of the contact finger 100.

The movable spring 120 is installed at each contact finger 100 through the through hole 112 of the mover holder 110 so as to provide an elastic force to the contact finger 100. That is, the movable spring 120 pressurizes the contact finger 100 in an inner radial direction of the mover holder 110. Here, the movable spring 120 may be supported in the outer portion of the mover holder 110 through which the through holes 112 are formed.

Figure 4:
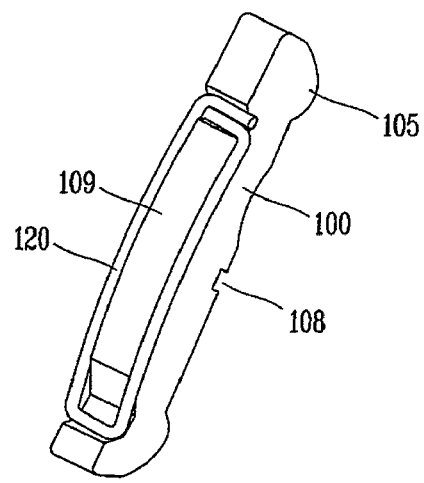
FIG. 4 is a front perspective view of the contact finger of FIG. 1.
Figure 5:
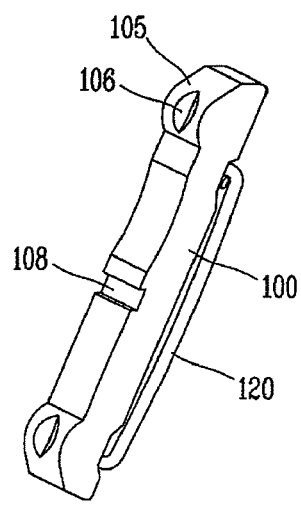
FIG. 5 is a rear perspective view of the contact finger of FIG. 1.
Figure 6:
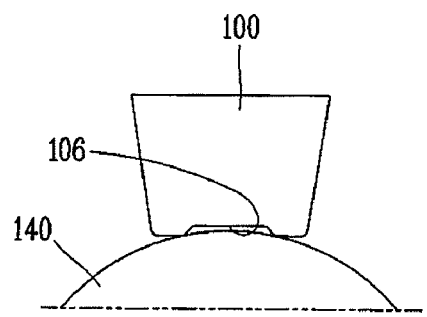
FIG. 6 is a front view that the terminal of FIG. 1 comes in contact with the contact finger.

Referring to FIGS. 4 and 5, a semicircular protrusion 105 contactable with outer surfaces of terminals may be formed at both end portions of each contact finger 100. The semicircular protrusion 105 may be divided into two sides by a separation groove 106. That is, a lower surface of the semicircular protrusion 105 is divided into two parts to come in contact with an outer surface of the terminal. Accordingly, contact points with the terminal are formed at both sides of the semicircular protrusion 105. Referring to FIG. 6, the contact points with the is terminal of the contact finger 100 are provided at both sides of the lower surfaces of the semicircular protrusions 105, such that the contact finger 100 can be supported more stably than a contact point with the terminal being provided at the lower surface of the semicircular protrusion 105.

Each of the contact fingers 100 may be provided with a coupling recess 108 in which the mover holder 110 is fixed (engaged). The coupling recess 108 of the contact finger 100 may be recessed in a lower surface of a central portion of the contact finger 100, and formed in a rectangular shape having both sides open such that a circular plate 115 configuring the mover holder 100 can be inserted therein.

Referring to FIG. 4, the contact finger 100 may be provided with a connection portion 109 along which the movable spring 120 is inserted. Here, the movable spring 120 is a rod curved into a rectangular shape, thus to be fixed onto an upper surface of the contact finger 100 with surrounding the connection portion 109.

Figure 7:
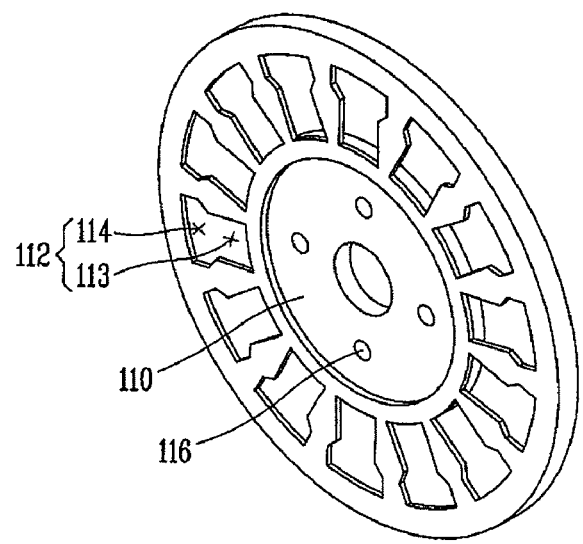
FIG. 7 is a front perspective view of a mover holder of FIG. 1.
Figure 8:
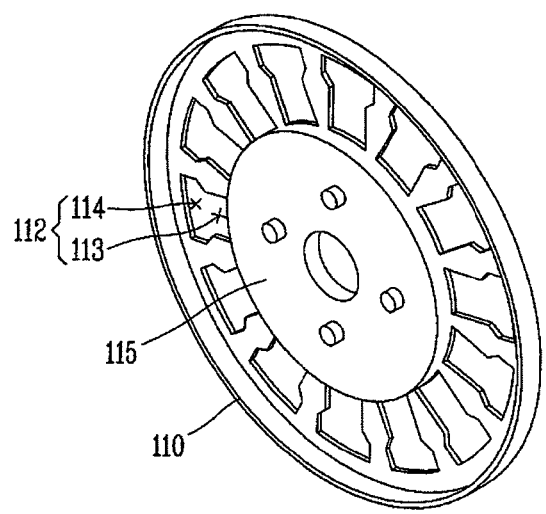
FIG. 8 is a rear perspective view of the mover holder of FIG. 1.

Referring to FIGS. 5, 7 and 8, the mover holder 110 may be provided with a circular plate 115 inserted in the coupling recesses 108 of the contact fingers 100 to restrict a lateral movement of the contact fingers 100. The circular plate 115 may be riveted to the mover holder 110. That is, circular protrusions 116 are formed at the mover holder 110, and holes (not shown) in which the circular protrusions 116 are inserted are formed through the circular plate 115. Accordingly, the circular protrusions 116 are inserted in the holes such that the circular plate 115 can be coupled to the mover holder 110.

Here, each through hole 112 of the mover holder 110 may be provided with a narrow rectangular portion 113 in which the contact finger 100 is disposed, and a wide rectangular portion 114 in which the movable spring 120 is disposed.

The narrow rectangular portion 113 of the through hole 112 may be formed to be matched with the contact finger 100, and the wide rectangular portion 114 may have a width which is set to be matched with an outer shape of the movable spring 120. Here, when the movable spring 120 is coupled to the contact finger 100, both sides of the movable spring 120 protrude outwardly from the contact finger 100. The width of the wide rectangular portion 114 may thusly depend on the protruded size of the movable spring 120.

Figure 9:
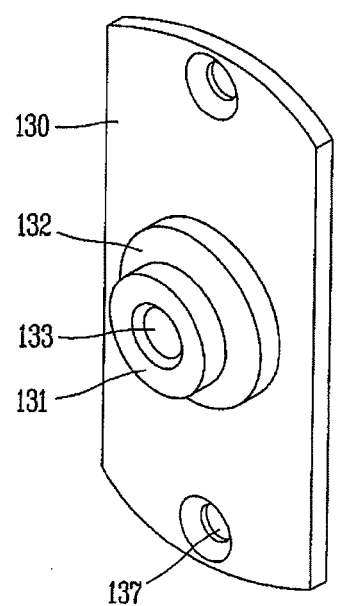
FIG. 9 is a perspective view of the supporting plate of FIG. 2.

Referring to FIGS. 2 and 9, a supporting plate 130 for supporting a side surface of an end portion of a terminal is connected to the mover holder 110. The supporting plate 130 is provided with an insertion body 131 inserted in the mover holder 110. The insertion body 131 is provided with an annular tilt surface 132 supported at the mover holder 110.

Figure 10:
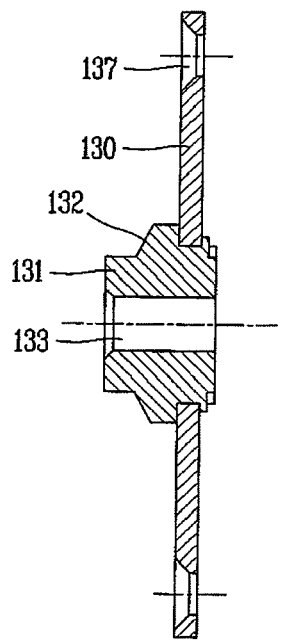
FIG. 10 is a longitudinal sectional view of the supporting plate of FIG. 9.

As shown in FIG. 10, the insertion body 131 may be provided with a coupling path 133 through which a screw is coupled. After the insertion body 131 is inserted in the mover holder 110, a bolt 135 and a washer 136 for preventing the separation of the mover holder 110 are coupled to the opposite side to the insertion direction, such that the insertion body 131 can be movably fixed to the mover holder 110. Further, the supporting plate 130 may be provided with coupling openings 137 through which coupling members are inserted to couple the supporting plate 130 to terminals. Both upper and lower sides of the supporting plate 130 may be formed to be arcuate.

Here, the insertion body 131 of the supporting plate 130 is inserted in a central portion of the mover holder 110. The insertion body 131 is supported at the central portion of the mover holder 130 by the tilt surface 132 having an expanded diameter. Here, the insertion body 131 can be slipped into the central portion of the mover holder 130 by the tilt surface 132. That is, the insertion body 131 may be rotatable by a preset angle in all directions (up and down and right and left).

Figure 11:
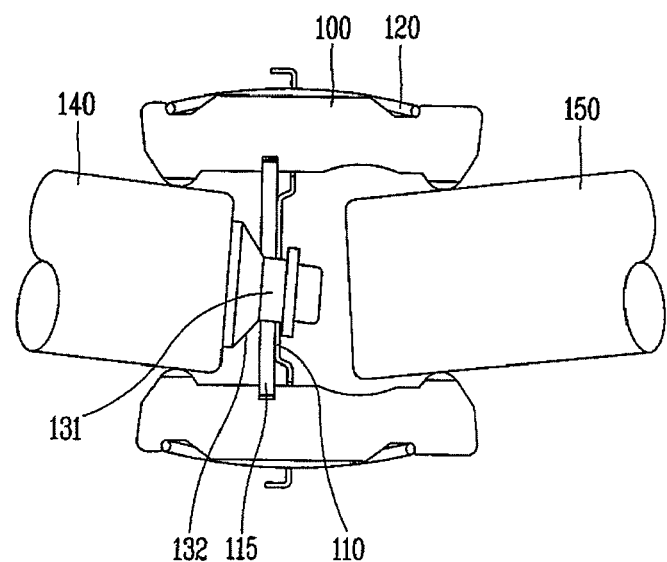
FIG. 11 is a cross-sectional view showing the main circuit terminal and the bushing terminal of FIG. 1 are coupled to the tulip contacting device of FIG. 1.

FIG. 11 shows a maim circuit terminal 140 and a bushing terminal 150 are inserted in both sides of a tulip contacting device and then they are curved (inclined). That is, since the main circuit terminal 140 is supported at the supporting plate 130, and the insertion body 131 of the mover holder 130 is rotatable by a preset angle in the mover holder 110, the main circuit terminal 140 may be curved (inclined) with being supported at the contact fingers 100. The contact fingers 100 may elastically support the main circuit terminal 140 by the movable springs 120. Here, the bushing terminal 150 may be rotatable in an inner space formed by the contact fingers 100. Here, when the main circuit terminal 140 and the bushing terminal 150 are rotated, the contact fingers 100 are rotated about the mover holder 110.

As such, as the main circuit terminal 140 and the bushing terminal 150 are moved, the contact fingers 100 supported by the movable springs 120 are elastically rotatable. Hence, the contact fingers 100 can provide the flexibility with being kept arranged at the mover holder 110 in the circumferential direction.

In the tulip contacting device for the vacuum circuit breaker in accordance with the one embodiment of the present invention, the contact fingers are bidirectionally rotatable in the state of being restricted at the outer diameter portion of the mover holder, whereby the flexibility of the contact fingers can be increased. Therefore, upon assembling (coupling) the vacuum circuit breaker to a case, it is possible to flexibly deal with the variation of axial angles of terminals inserted in both sides of the tulip contacting device. Also, the springs may be coupled to the contact fingers, respectively, so as to effectively prevent the separation and overall destroy of the contact fingers from the mover holder during installation.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A tulip contacting device for a vacuum circuit breaker, comprising:
    a plurality of contact fingers disposed in a circumferential direction so as to allow an insertion of terminals;
    a mover holder having through holes formed in a circumferential direction, each contact finger being inserted and restricted in the corresponding through hole; and
    movable springs coupled onto the contact fingers in the through holes of the mover holder and configured to provide an elastic force to the contact fingers,
    wherein the mover holder is provided with a circular plate inserted in the contact fingers so as to restrict a lateral movement of the contact fingers.

2. The device of claim 1, wherein semicircular protrusions contactable with outer surfaces of the terminals are formed at both end portions of each contact finger, a separation groove being formed at each semicircular protrusion.

3. The device of claim 1, wherein a coupling recess engaged with the mover holder is formed at each contact finger.

4. The device of claim 1, wherein each of the contact fingers is provided with a connection portion along which the movable spring is inserted.

5. The device of claim 1, wherein the movable spring comprises a rod curved into a rectangular shape.

6. The device of claim 1, wherein each of the through holes of the mover holder is provided with a narrow rectangular portion in which the contact finger is disposed, and a wide rectangular portion in which the movable spring is disposed.

7. The device of claim 1, wherein a supporting plate for supporting a terminal is connected to the mover holder, the supporting plate having an insertion body inserted in the mover holder, wherein the insertion body is provided with an annular tilt surface supported at the mover holder.

8. The device of claim 7, wherein the insertion body is provided with a coupling path through which a screw is coupled.

9. The device of claim 7, wherein the supporting plate is provided with coupling openings for allowing the coupling to the terminal.

* * * * *